United States Patent
Avril

(10) Patent No.: US 11,155,925 B2
(45) Date of Patent: Oct. 26, 2021

(54) METHOD FOR MANUFACTURING A DECORATIVE ARTICLE

(71) Applicant: MECO SA, Grenchen (CH)

(72) Inventor: Hervé Avril, Les Breuleux (CH)

(73) Assignee: MECO SA, Grenchen (CH)

( * ) Notice: Subject to any disclaimer, the term of this patent is extended or adjusted under 35 U.S.C. 154(b) by 0 days.

(21) Appl. No.: 16/686,496

(22) Filed: Nov. 18, 2019

(65) Prior Publication Data
US 2020/0199761 A1    Jun. 25, 2020

(30) Foreign Application Priority Data
Dec. 24, 2018  (EP) .................................... 18215880

(51) Int. Cl.
*C23C 28/02* (2006.01)
*B22F 3/22* (2006.01)
(Continued)

(52) U.S. Cl.
CPC ............ *C23C 28/023* (2013.01); *B22F 3/225* (2013.01); *B23P 13/00* (2013.01); *C23C 28/021* (2013.01);
(Continued)

(58) Field of Classification Search
CPC ..... C23C 28/023; C23C 28/021; B23P 13/00; B22F 3/225; B22F 3/1007;
(Continued)

(56) References Cited

U.S. PATENT DOCUMENTS 6,365,073 B1 *  4/2002  De Sisti ................ B29C 59/021
                                                        264/1.24
6,466,522 B1 * 10/2002  Yoshioka ............... G04C 10/02
                                                        368/223
(Continued)

FOREIGN PATENT DOCUMENTS

CH          698 824 B1   4/2010
CH          708 418 A2   2/2015
(Continued)

OTHER PUBLICATIONS

European Search Report of European Application No. 18 21 5880 dated Jul. 1, 2019.
(Continued)

*Primary Examiner* — Sarang Afzali
*Assistant Examiner* — Darrell C Ford
(74) *Attorney, Agent, or Firm* — Sughrue Mion, PLLC

(57) ABSTRACT

A method for manufacturing a decorative article (2) including the following steps of: making a blank by injection moulding a material comprising a metallic material, machining and/or polishing the blank to form a product, and forming the product to print a raised or recessed relief pattern (3) on part of the surface of the product, the product with the pattern (3) forming the decorative article. Also, a decorative article, notably an external timepiece part made of a sintered material having on part of its surface a raised or recessed relief pattern (3) made by a forming process. Preferably, the sintered material is a grade 5 titanium alloy (Ti6V4Al) or a stainless steel.

11 Claims, 1 Drawing Sheet

(51) Int. Cl.
*B23P 13/00* (2006.01)
*B22F 3/24* (2006.01)
*B22F 3/10* (2006.01)

(52) U.S. Cl.
CPC ....... *B22F 3/1007* (2013.01); *B22F 2003/241* (2013.01)

(58) Field of Classification Search
CPC ........ B22F 2003/241; B22F 5/00; B22F 3/24; B22F 2003/247; G04B 37/22; G04B 3/041; G04B 19/12; G04B 45/0076; C22C 14/00; B29C 45/0001; B29C 45/0055; B29C 2045/0058; B29C 59/005; B29C 59/02

USPC ...................... 264/162, 293, 328.1
See application file for complete search history.

(56) References Cited

U.S. PATENT DOCUMENTS

| | | | |
|---|---|---|---|
| 2004/0231159 A1* | 11/2004 | Shibuya | G04B 37/22 29/896.412 |
| 2016/0263653 A1* | 9/2016 | Kim | C22C 1/002 |
| 2017/0067137 A1* | 3/2017 | Kawasaki | C22C 14/00 |
| 2017/0283912 A1* | 10/2017 | Nakamura | C22C 14/00 |
| 2017/0292195 A1* | 10/2017 | Roberge | C23C 4/134 |
| 2017/0334236 A1* | 11/2017 | Grossenbacher | C25D 1/10 |
| 2018/0264547 A1* | 9/2018 | Tamura | C22C 1/0433 |

FOREIGN PATENT DOCUMENTS

| | | |
|---|---|---|
| CN | 109070229 A | 12/2018 |
| EP | 1 577 416 A1 | 9/2005 |

OTHER PUBLICATIONS

Office Action dated Aug. 16, 2021 from the China National Intellectual Property Administration in CN Application No. 201911346992.2.

* cited by examiner

METHOD FOR MANUFACTURING A DECORATIVE ARTICLE

CROSS REFERENCE TO RELATED APPLICATIONS

This application claims priority to European Patent Application No. 18215880.8, filed on Dec. 24, 2018, the entire contents of which are incorporated herein by reference.

FIELD OF THE INVENTION

The present invention relates to method for manufacturing by MIM (Metal Injection Moulding) a decorative article, particularly an external timepiece part. More precisely, it concerns a method for manufacturing a decorative article intended, after injection moulding and any machining or finishing steps, to be embossed or debossed to print a raised or recessed relief structure on part of the surface of the article. It also relates to the article obtained by the manufacturing method.

PRIOR ART

Many watchmakers use logos in raised or recessed relief which make their brand visible on the timepiece. Nowadays, cold forming is the most economical way to create an embossed or debossed print with a very good surface finish on metal components. Some materials may have a high elastic limit which will require significant stresses to be applied during the forming process in order to mark the component. In particular, titanium alloys, including grade 5 titanium (Ti-6Al-4V), sought-after for their good mechanical properties combined with a low density, are very difficult to emboss/deboss. This is particularly true for timepiece components such as crowns, pushers or valves made from 5-15 mm diameter wires subjected to cold working of the material during the wire drawing or drawing process. The application of high stresses especially during embossing/debossing operations results in a high wear rate of the forming tools with a corresponding increase in manufacturing costs. Further, the difficulty in embossing/debossing parts made of materials with a high elastic limit results in a high scrap rate of the parts.

SUMMARY OF THE INVENTION

It is an object of the present invention to overcome the aforecited drawbacks by proposing a manufacturing method that reduces the scrap rate and wear of embossing/debossing tools.

To this end, the present invention proposes a method for manufacturing a decorative article and, in particular an external timepiece part, comprising a step of making a blank by injection moulding, also known as MIM, wherein a metal is mixed with a binder, then injected into a mould; the workpiece is then "debinded" in a controlled atmosphere furnace and then sintered. This method avoids the cold working inherent to deformation manufacturing processes, such as wire drawing, rolling, drawing, etc. If follows that the forming step, notably embossing or debossing, is performed with lower stresses, which limits wear of the tools on the one hand, and, on the other hand, facilitates the embossing/debossing and thus reduces the scrap rate compared to embossed/debossed articles made from conventional drawn, rolled or wire drawn materials.

Preferably, the blank produced by injection moulding forms a semi-finished product intended to be dimensioned during a subsequent machining step, prior to the forming process. This makes it possible to manufacture decorative articles of various shapes using a mould with a given geometry which may be simple, for example in the form of a billet or ingot. This results in a reduction in manufacturing costs.

The method according to the invention is more specifically adapted to the manufacture of decorative articles made of materials with a high elastic limit, such as Ti6Al4V or stainless steels. However, the present invention does not preclude also using this method for materials having lower elastic limits.

The present invention also relates to the decorative article produced by this method which is characterized by its sintered structure with the embossed or debossed pattern on one part of the surface made by forming.

The decorative article is more specifically an external timepiece part and, in particular, a valve, a crown or a pusher.

Other features and advantages of the present invention will appear in the following description of a preferred embodiment, given by way of non-limiting example, with reference to the annexed drawings.

DETAILED DESCRIPTION

Figure 2:
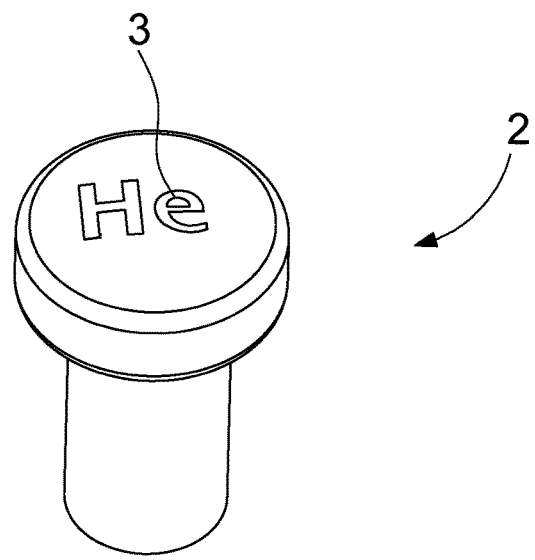
FIG. 2 represents a three-dimensional view of a valve obtained by the method according to the invention.

The present invention relates to a method for manufacturing a decorative article made of a metal material. The decorative article may be a constituent element of watches, jewelry, bracelets, brooches, necklaces, etc. In the field of horology, the article may be an external part, such as a valve, a pusher, a crown, a case middle, a back cover, a bezel, a bracelet link, a bracelet clasp, a dial, etc. More particularly, it is a control member, such as a crown or a pusher, or more generally a user-actuated member such as a valve. By way of illustration, a helium release valve 2 with the logo He, referenced 3, on the valve head, made by the method of the invention is represented in FIG. 2. The article is preferably made of a titanium alloy such as grade 5 titanium (Ti-6Al-4V) which contains by weight 6% of aluminium and 4% of vanadium. It may also be a stainless steel and preferably a nickel-free austenitic stainless steel such as Böhler® P570 or with nickel such as 316L stainless steel.

Figure 1A:
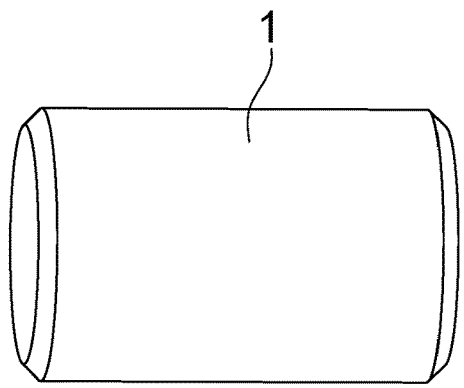
FIG. 1a schematically illustrates a first step implemented during manufacture, according to the invention, of a valve.
Figure 1B:
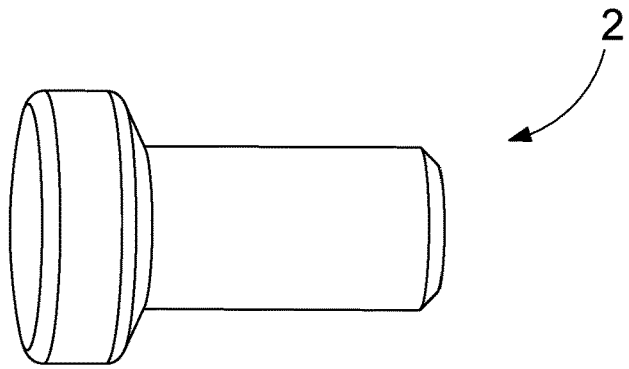
FIG. 1b schematically illustrates a second step implemented during the manufacture, according to the invention, of the valve.
Figure 1C:
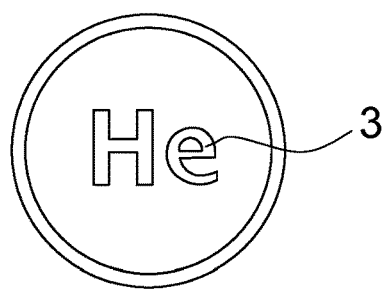
FIG. 1c schematically illustrates a third step implemented during manufacture, according to the invention, of the valve.

The method for manufacturing the article includes, in succession, a step of injection moulding (also referred to as MIM) a blank, a step of machining and/or polishing the blank and a forming step to print a raised or recessed relief pattern on the machined and/or polished blank. Preferably, the blank is a semi-finished product intended to be dimensioned during the machining step. Thus, as shown schematically in FIGS. 1a-c for a valve 2, the MIM manufacturing process may consist in manufacturing a cylindrical billet 1 of standard dimensions (FIG. 1a), which is then cut machined (e.g. bar turning) and polished to give it the desired geometry and finish (FIG. 1b). This variant is preferred since it makes it possible to make a set of parts having different geometries from the same mould. It is evident that the shape of the mould is adapted according to the type of article to be made and could have another simple shape, such as an ingot shape. It is also conceivable for the blank produced by the MIM process to have a substantially identical geometry to that of the finished product. In such case, the machining and/or polishing step is similar to a finishing step rather than dimensioning step. Next, the product resulting from machining and/or polishing is embossed to print the pattern 3 (FIG. 1c) which is in raised relief in the illustrated example.

In more detail, the manufacturing method includes the following steps:

a) Making a blank by injection moulding a material comprising a metallic material. In a known manner, the step of injection moulding (MIM) the blank consists in preparing a feedstock containing the metal powder and an organic binder system (paraffin, polyethylene, etc.). Next, the feedstock is injected and debinded, for example by thermal degradation or by dissolution in a solvent. The blank is then sintered. According to the invention, the metal powder has a d50 comprised between 0.1 and 20 µm, preferably between 8 and 15 µm, and sintering is performed at a temperature comprised between 1100 and 1500° C., preferably between 1200 and 1350° C., for a time comprised between 1 and 10 hours, preferably between 2 and 6 hours, under an inert atmosphere, for example argon.

b) Machining and/or polishing the blank to obtain a product. Machining can be performed by any material removal technique.

c) Forming the product to print a raised or recessed relief pattern on part of the surface of said product. The final step to print the pattern, which can also be called a structure, is preferably a cold process. It can be performed in one or more passes, possibly with a heat treatment between the passes.

After forming, the product can be subjected to a finishing treatment, such as an electrochemical treatment (anodization, grinding, etc.) or a decorative treatment such as a satin finishing or polishing treatment.

The article produced by the manufacturing method has the characteristic of being made of a sintered material having on part of its surface a raised or recessed relief pattern made by forming.

The invention claimed is:

1. A method for manufacturing a decorative article comprising the following steps of:
    making a blank by injection moulding a material comprising a metallic material,
    machining or polishing the blank to obtain a product, and
    forming the product to print a raised or recessed relief pattern (3) on part of the surface of said product, said product with the pattern (3) forming the decorative article,
    wherein the forming is a cold process that is performed in at least one pass followed by a heat treatment or in a plurality of passes with a heat treatment between at least two of the plurality of passes.

2. The method according to claim 1, characterized in that said metallic material is a titanium alloy or a stainless steel.

3. The method according to claim 2, characterized in that said metallic material is the titanium alloy, and said titanium alloy is an alloy Ti-6Al-4V.

4. The method according to claim 2, characterized in that said metallic material is the stainless steel.

5. The method according to claim 1, characterized in that the decorative article is an external timepiece part that is a pusher, a crown, a valve (2), a case middle, a back cover, a bezel, a bracelet link, a bracelet clasp, or a dial.

6. The method according to claim 1, characterized in that the blank is a semi-finished product subjected to the machining to obtain said product in which an entirety of said product has a shape identical to an entirety of the decorative article.

7. The method according to claim 6, characterized in that the decorative article is an external timepiece part chosen from among a valve (2), a crown, and a pusher and in that the semi-finished product is a cylindrical billet (1).

8. The method according to claim 7, characterized in that the cylindrical billet (1) is subjected to the machining prior to the forming.

9. The method according to claim 1, characterized in that an entirety of the blank produced by the injection moulding has a shape of an entirety of the decorative article.

10. The method according to claim 1, characterized in that the step of making the blank includes the following sub-steps of:
    a) making a feedstock containing a metal material powder and an organic binder system, said metal material powder having a d50 comprised between 0.1 and 20 µm,
    b) injection moulding to form the blank,
    c) debinding the blank, and
    d) sintering at a temperature comprised between 1100 and 1500° C., for a time comprised between 1 and 10 hours under an inert atmosphere.

11. The method according to claim 1, characterized in that, after the forming, the product with the pattern (3) is subjected to a finishing treatment that is an electrochemical treatment, a satin-finishing treatment, or a polishing treatment.

* * * * *